10/15/85 XR 4,546,549

United States Patent [19]

Duperon

[11] Patent Number: 4,546,549

[45] Date of Patent: Oct. 15, 1985

[54] ADJUSTABLE SPIRIT LEVEL CONSTRUCTION

[76] Inventor: Terry Duperon, 5693 Becker Road, Saginaw, Mich. 48601

[21] Appl. No.: 628,519

[22] Filed: Jul. 5, 1984

[51] Int. Cl.[4] .................... B23B 45/00

[52] U.S. Cl. .................... 33/334; 33/DIG. 1; 33/390; 33/347; 33/384; 408/16; 408/241 R

[58] Field of Search .................... 408/16, 241 R, 112; 33/334, 347, 371, 384, 388, 390

[56] References Cited

U.S. PATENT DOCUMENTS 3,664,032 5/1972 Tompkins .................... 33/334
4,079,520 3/1978 Davis .................... 33/384 X
4,125,944 11/1978 Esposito .................... 33/334 X
4,457,078 7/1984 Suchy .................... 408/16 X

*Primary Examiner*—James M. Meister
*Attorney, Agent, or Firm*—Learman & McCulloch

[57] ABSTRACT

A spirit leveling attachment for a power tool which is universally adjustable relative to the tool so as to enable the tool to be located in anyone of a number of selected positions of angularity and maintained in such position by visual reference to the spirit level. A magnetized support member having a partly spherical recess is mounted on the tool. The spirit level is formed with a partly spherical body member which is accommodated in the recess of the magnetized support member, enabling the body member to be magnetically retained in the recess in selected positions of adjustment relative to the support member.

8 Claims, 7 Drawing Figures

ADJUSTABLE SPIRIT LEVEL CONSTRUCTION

This invention relates to an adjustable spirit level that is particularly adapted for use in connection with a hand or other tool the position of which is adjustable.

BACKGROUND OF THE INVENTION

When a hand-held tool, such as a power drill, is used for the boring of a hole in a wall, a workpiece, or the like, it often is difficult for the user to maintain the drill in a position in which the axis of the hole forms a desired angle with a horizontal or vertical plane. For example, if it is desired to drill a hole in a vertical wall so that the axis of the hole is perpendicular to the wall, the axis of the drill at all times must be maintained in a position that is perpendicular to the wall surface. Not many persons are sufficiently skilled to be able to distinguish between true perpendicularity and slight deviations therefrom. In those instances in which the axis of a drilled hole is at some angle other than normal to a horizontal or vertical plane, it is even more difficult for the user of a hand-held tool to orient and maintain the tool at the proper position of angularity.

The difficulties encountered in positioning and maintaining a hand-held tool at a selected position of angularity also exist in connection with tools supported on adjustable brackets, and the like, although to a lesser extent inasmuch as jigs or fixtures can be used to locate the tool initially at the desired angularity. However, during use of such a tool it sometimes happens that the adjustable jig or fixture slips or otherwise changes position. Sometimes the changes in position may be noted visually but oftentimes the changes are undetected.

Apparatus constructed in accordance with the invention includes a spirit level that is adapted for attachment to any tool of the class referred to and is universally adjustable relative to the tool so as to enable the tool to be located in any one of a number of selected positions of angularity and maintained in such position by visual reference to the spirit level.

SUMMARY OF THE INVENTION

Apparatus constructed in accordance with the invention comprises a magnetized support member having a partly spherical recess in one surface thereof. The support is adapted to be mounted on any one of a number of different kinds of tools and be magnetically maintained thereon.

A spherical body member formed on a radius corresponding to that of the recess is formed of magnetically permeable material and is rotatably accommodated in the recess for universal adjustment relative thereto. The body member has an opening in communication with an internal cavity that is occupied by a liquid. The opening is sealed by a transparent closure, and the quantity of liquid in the cavity is such as to enable a gas bubble to form between the liquid and the closure so as to be visible through the latter.

An adapter formed of magnetically permeable material is provided and has two right angular legs. Means is provided to mount the adapter on a tool so as to provide two mutually normal, flat planes on either of which the support member may be mounted and maintained magnetically.

THE DRAWINGS

A presently preferred embodiment of the invention is disclosed in the following description and in the accompanying drawings, in which.

THE PREFERRED EMBODIMENT

Figure 1:
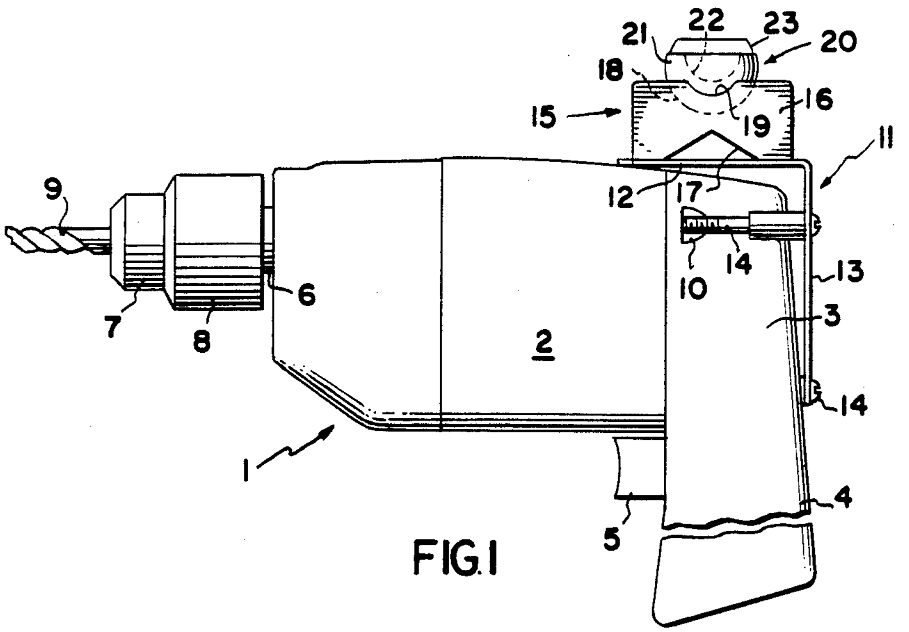
FIG. 1 is a fragmentary, side elevational view of a hand-held, portable power drill equipped with apparatus constructed in accordance with the invention.
Figure 2:
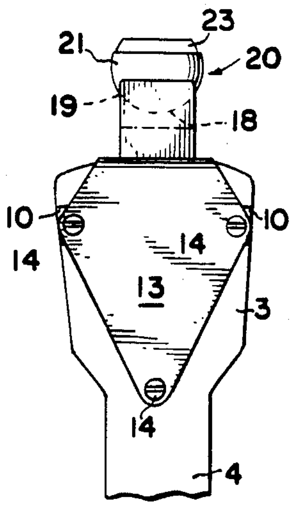
FIG. 2 is a fragmentary end elevational view.
Figure 3:
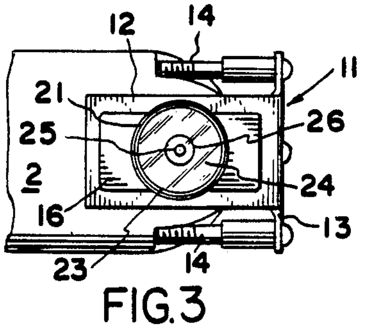
FIG. 3 is a fragmentary top plan view.

Apparatus constructed in accordance with the disclosed embodiment of the invention is adapted for use in conjunction with a hand-held tool 1 such as a power drill having a body 2 which accommodates an electric motor (not shown) and has a closure 3 at its rear end provided with a depending grip 4 and a manually operable switch 5 for controlling the operation of the drill motor. The power drill has a rotary shaft 6 on which is mounted a collet 7 and locking ring 8 by means of which a drill bit 9 or other rotary tool may be supported for rotation. The closure 3 conventionally has sockets 10 for the accommodation of screws which maintain the body 2 and the closure 3 in assembled relation.

As is most often the case, the configuration of the body 2 and the closure 3 are such that they are neither flat nor normal to each other. In such a case an adapter 11 is provided for a purpose presently to be explained. The adapter has two legs 12 and 13 that are normal to each other. The leg 13 is provided with a number of openings through which screws 14 pass. Two of the screws should be of such length as to be accommodated in the sockets 10.

The apparatus includes a support member 15 formed of permanently magnitized material and comprising a block 16 of generally rectangular configuration. The bottom surface of the block preferably has a V-shaped notch 17 therein whereas the upper surface has a part-spherical recess 18 therein. The radius on which the recess 18 is formed is greater than the width of the block 16, as a consequence of which opposite sides of the block have diametral grooves 19 in communication with the recess.

A body member 20 has a partly spherical portion 21 formed on a radius corresponding to that of the recess 18, but the depth of the recess is less than half the height of the body member. The body 20 is cut along a chord parallel to a diameter of the body to form an open side that communicates with a cavity 22. The cavity is occupied by a quantity of liquid.

The open side of the body portion 21 is closed by a closure 23 having a transparent wall portion 24 that is so shaped as to enable the liquid in the cavity 22 to form a gas or air bubble 25 that is visible through the wall 24. Preferably, a circle line 26 is scribed on the wall 24 at the center thereof.

Since the support member 15 is magnetized permanently it can be seated on either of the legs 12 or 13 of the adapter 11. The body 20 may be accommodated in the recess 18 and be retained therein by the magnetic attraction between the member 15 and the member 20. However, the body 20 may be adjusted universally through 180° relative to the support member 15 and retained magnetically at any selected one of a plurality of adjusted positions. Since the depth of the recess 18 is less than half the height of the body 20, the circle 26 is clearly visible even when the body is rotated 90° from the position shown in FIG. 1 to the position shown in FIG. 4.

Figure 4:
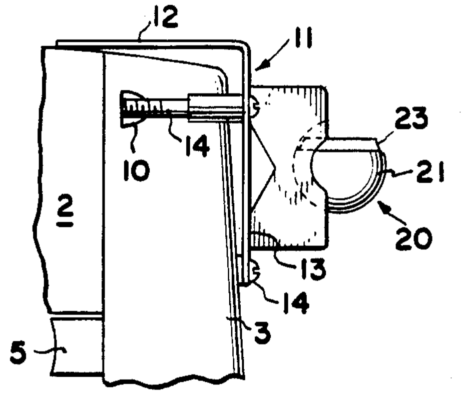
FIG. 4 is a fragmentary view similar to FIG. 1, but illustrating the spirit level in an adjusted position.

To condition the apparatus for operation, the adapter 11, if required, may be assembled with the drill body 1. If it is intended that the drill bit 9 drill a horizontal hole in a vertical wall, then the body 15 will be supported on the adapter 12, as shown in FIGS. 1 or 4, and the body 20 adjusted relative to the support member 15 so that the bubble appears at the center of the transparent wall 24. The grooves 19 facilitate adjustment of the body 20. In these positions of the parts the longitudinal axis of the drill bit 9 will be horizontal. The operator then may actuate the drill motor and, by maintaining the bubble 25 in the centered position, drill a hole having a horizontal axis.

Figure 6:
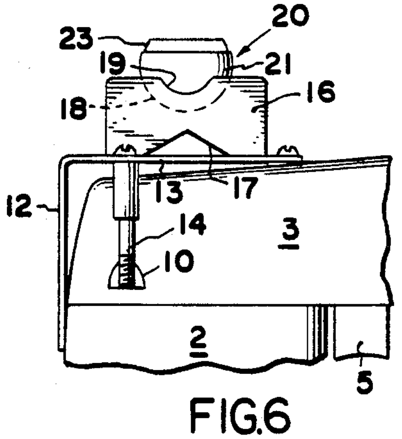
FIG. 6 is a view similar to FIG. 1, but illustrating the drill and the spirit level in adjusted positions.

It is possible to mount the support member 15 on the leg 13 of the adapter 11 in the manner illustrated in FIG. 6, and thereby enable the drill bit 9 to drill a hole having a vertical axis.

Figure 5:
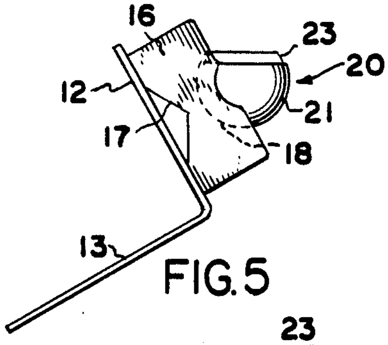
FIG. 5 is a view similar to FIG. 4, but illustrating the spirit level in a further position of adjustment.

The drill bit 9 may be maintained in any selected one of a number of different angular positions, as is indicated in FIG. 5, and the body member 20 adjusted so that the bubble 25 occupies a centered position whenever the angle of the axis of the drill bit corresponds to the desired angle.

Figure 7:
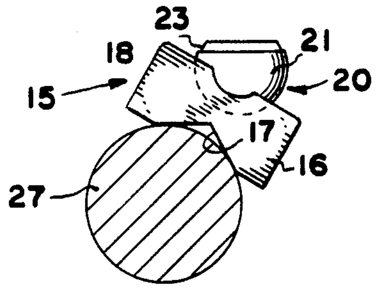
FIG. 7 is a sectional view illustrating the spirit level supported on a cylindrical member.

FIG. 7 illustrates the support member 15 mounted on a magnetically permeable cylindrical holder 27, rather than a flat member. The notch 17 of the lower surface of the block 16 facilitates the mounting of the apparatus on a non-planar surface.

The disclosed embodiment is representative of a presently preferred form of the invention, but is intended to be illustrative rather than definitive thereof. The invention is defined in the claims.

I claim:

1. A magnetic and adjustable spirit level construction adapted for use in connection with a hand or other adjustable-position tool, said construction comprising a support member formed of magnetically permeable material, one surface of said support member having a partly spherical recess therein; a partly spherical body member formed on a radius corresponding to that of said recess and accommodated therein, said body member being formed of magnetically permeable material and having an opening therein in communication with an internal cavity in said body member; a liquid occupying said cavity; and a transparent closure for sealing said opening, said liquid being present in such an amount as to enable a gas bubble to form in said cavity, said body member being universally adjustable relative to said support member, and one of said members being magnetized thereby enabling said body member to be retained in said recess in any one of a plurality of selected positions of adjustment relative to said support member.

2. The construction according to claim 1 wherein said support member has a V-shaped notch in its bottom.

3. The construction according to claim 1 wherein said recess has a depth less than the height of said body member.

4. The construction according to claim 1 wherein said recess has a depth less than half the height of said body member.

5. The construction according to claim 1 wherein said body member has grooves extending diametrally of said recess and in communication therewith.

6. The construction according to claim 1 including an adapter having a pair of magnetically permeable legs normal to one another, either of said legs being capable of providing a seat for said support member.

7. The construction according to claim 6 including means for removably securing said adapter on a tool.

8. The construction according to claim 1 wherein said support member has a width less than the diametral dimension of said body member.

* * * * *